April 19, 1955     E. A. JOHNSON     2,706,806
ILLUMINATED DISPLAY DEVICE FOR VEHICLES
Filed Oct. 3, 1952
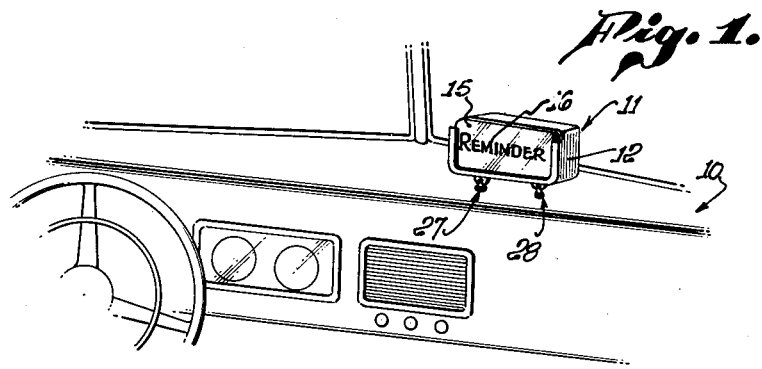
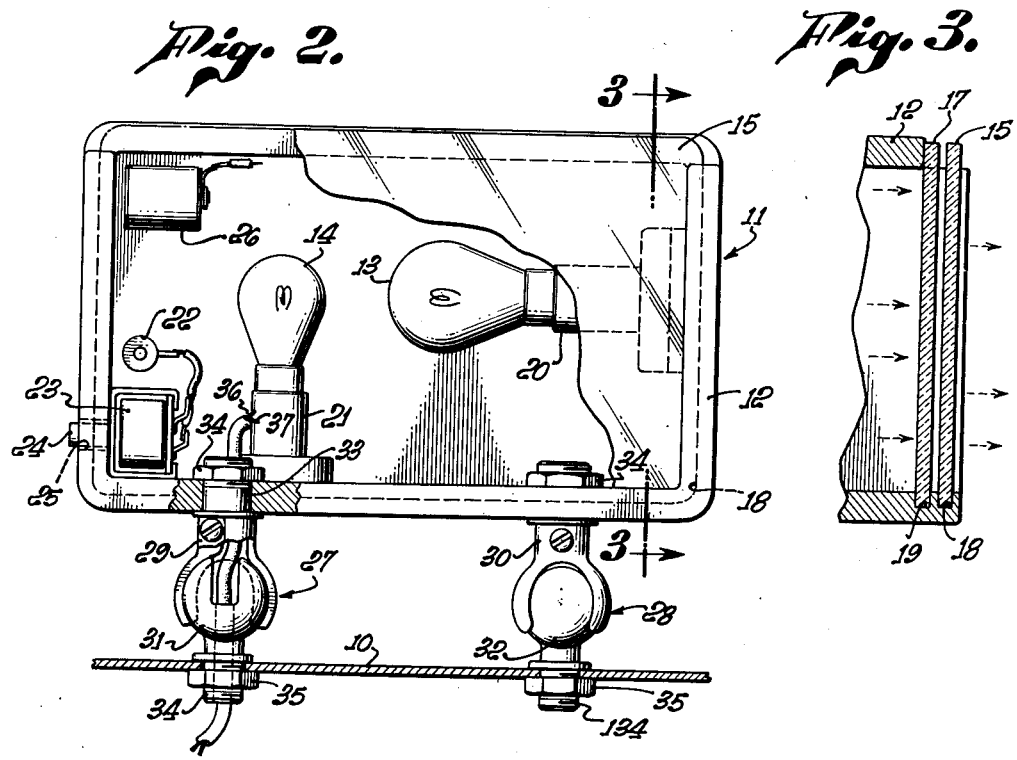
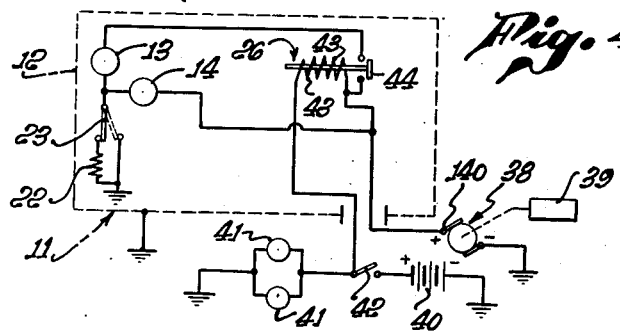
EUGENE A. JOHNSON,
INVENTOR.
BY
ATTORNEY.

United States Patent Office 2,706,806
Patented Apr. 19, 1955

2,706,806

ILLUMINATED DISPLAY DEVICE FOR VEHICLES

Eugene A. Johnson, Los Angeles, Calif.

Application October 3, 1952, Serial No. 312,952

8 Claims. (Cl. 340—52)

This invention relates to improved display devices of a type adapted to be mounted in an automobile or other motor vehicle at a location to be viewed by a driver.

Devices embodying the invention are especially intended and adapted to be used as reminders, for repeatedly reminding a vehicle driver of a particular matter which may be of considerable importance to him. For example, a salesman who uses his car in calling on the customers may utilize the device to keep uppermost in his mind a certain bonus, prize, sales volume, or other goal toward which he may be striving. Particularly contemplated is a reminder device of the above character whose condition changes often and repeatedly during driving, and preferably at very irregular intervals, to prevent a driver from becoming accustomed to the device and ceasing to notice it.

In accordance with the invention, the present device includes a display element carrying writing, a picture or other display markings visible to a driver of a vehicle, in combination with an electric light positioned to illuminate the display element and its markings. The display element preferably takes the form of a light passing slide removably mounted in the vehicle, with the light being positioned behind the slide. The illumination may be rendered intermittent and irregular by connecting the light for energization directly by the generator of the vehicle, so that the light is energized only when the vehicle engine is operating at a certain minimum speed.

Since illumination of the display element requires a much brighter light in the daytime than at night, I have found it desirable to incorporate in the device means for reducing the illumination at night. For this purpose, I prefer to employ two separate light elements in the device, together with means for turning off one of the elements at night. Specifically, the means for turning off one of these elements may be connected to a night driving light of the vehicle, as for instance its tail light, so that whenever the tail light is turned on, one of the display lighting elements, preferably a brighter one of the two, is turned off. A relay may be utilized to effect this control function. In order to further control the light intensity, I may provide a resistor which can be selectively connected either into or out of the energizing circuit of the two light elements, to vary the currents flowing through the elements.

The display light elements, as well as the other parts of the device, may be contained within an opaque housing which is mounted on the vehicle dash board. A display slide may then be removably mounted to an open side of the housing. The housing is desirably attached to the dashboard by a hollow connector fitting, through which may be passed the wires leading from the light elements and other parts to the vehicle generator and tail light circuits.

The above and other features and objects of the present invention will be better understood from the following detailed description of the typical embodiment illustrated in the accompanying drawing, in which:

Fig. 1 is a view showing a device embodying the invention applied to the dashboard of an automobile;

Fig. 2 is an enlarged front view of the device, partially broken away to reveal its inner parts;

Fig. 3 is a transverse section taken on line 3—3 of Fig. 2; and

Fig. 4 is a diagram of the electrical control circuit of the device.

I have fragmentarily represented in Fig. 1 the dashboard 10 of an automobile, to which is mounted the illuminated display device 11 of the invention. The device includes an opaque preferably rectangular housing 12 containing a pair of light bulbs 13 and 14, and having an open forward side across which is removably mounted a light passing display slide 15 to be illuminated by lights 13 and 14.

Housing 12 may be formed of any of numerous materials, such as a suitable heat resistant and fire proof resinous plastic material, or metal such as steel. In certain respects, metal formation of the housing is desirable, so that the electrical parts within the housing may be electrically grounded where desired by merely connecting them to the housing. As to the dimensions of the housing, it may typically be about 5″ wide, 3″ high and 2½″ deep.

Slide 15 may be formed of translucent glass or other light passing material, and carries display markings 16, which are to be illuminated by the lights 13 and 14. Behind slide 15, there may be provided a second translucent slide 17, which acts to diffuse or distribute the light of bulbs 13 and 14 across the area of the slides. Slides 15 and 17 are removably mounted to the forward side of housing 12 by suitable slide mountings, which may comprise grooves 18 and 19 formed in the two side walls and bottom wall of the housing. The housing is open across its upper side at the location of slides 15 and 17, to permit upward movement of the slides from their positions of retention within grooves 18 and 19.

The bulb 13 within housing 12 is of a size to burn considerably brighter than the second bulb 14. For example, bulb 13 may be of a 15-candle power size, and bulb 14 of a ½-candle power size. Bulb 13 is mounted within a conventional socket 20, which may be attached to a side of the housing, while bulb 14 is mounted in a socket 21, which may project upwardly from the bottom of the housing.

Contained within housing 12 is an electrical resistor 22, which is connectable into and out of the energizing circuits of bulbs 13 and 14 by an electric switch 23 also contained within the housing. The movable actuating element 24 of switch 23 projects through an opening 25 in a side of housing 12, to be manually actuable from the outside of the housing. In addition to the previously mentioned parts, the housing contains a relay 26, which functions to automatically open the energizing circuit to brighter bulb 13 when a driver closes the usual tail light control switch for night driving. Housing 12 is preferably mounted to the upper generally horizontal portion of dashboard 10 in a manner permitting adjustment of the housing to position its display slide 15 in essentially a vertical plane. For thus adjustably mounting the housing, I prefer to employ a pair of ball and socket type mounting fittings 27 and 28 including tightenable sectionally formed sockets 29 and 30 depending from the housing, and balls 31 and 32 projecting upwardly from dashboard 10. One of the sections of each of the sockets 29 and 30 may have a threaded portion 33 projecting upwardly through an opening in the bottom of the housing, and fastened to the housing by a nut 34. Similarly, each of the balls 31 and 32 may have a threaded portion 134 projecting downwardly through an opening in dashboard 10, and retained to it by a nut 35. The ball and socket of one of the housing mounting connections, typically the connection designated 27 in Fig. 2, are preferably tubular or hollow, to pass downwardly through the connection from within the housing to beneath the dashboard a pair of insulated electric wires 36 and 37, for connecting the parts within the housing to the car generator and tail light switch.

The circuit diagram of the apparatus is shown in Fig. 4, in which I have shown at 38 the usual automobile generator, which is driven at varying speeds by the automobile engine, typically represented at 39. The storage battery of the automobile is shown at 40, with the parallel connected external tail lights being shown at 41. Energization of the tail lights by battery 40 is controlled by a tail light switch 42, which is a portion of the usual dash mounted car light control switch.

As seen in Fig. 4, lights 13 and 14 are connected in parallel into an electric circuit which is energized only by generator 38. That is, the leads of this circuit are connected directly to the armature post 140 on the generator and to ground, so that battery 40 never acts to energize these two lights. Connectible into this same circuit is the previously mentioned resistor 22, which may be cut into or out of the circuit by the switch 23.

The coil 43 of relay 26 is connected at one end to the tail light side of tail light control switch 42, and at the other end to the positive side of generator 38. The movable contact 44 of relay 26 acts to open and close the energizing circuit of light 13, while not affecting the energizing circuit of dim light 14.

In applying the device to a vehicle, the ball and socket connections 27 and 28 are attached to dashboard 10, and housing 12 is then adjusted as permitted by connections 27 and 28 to a position in which slide 15 is essentially vertical. As will be understood, the adjustable type mounting of housing 12 is desirable, since the upper portions of the dashboards of different makes of cars extend at varying angles, and a rigid bracket made to fit one car might therefore be entirely unsuitable for another type car.

With the device connected into the automobile electric circuit as shown in Fig. 4, the automobile may be driven, and lights 13 and 14 then act to illuminate display slide 15 in accordance with the operation of generator 38. That is, when the vehicle is operating at a sufficient speed to light bulbs 13 and 14, the display slide will be illuminated and call the attention of the driver to its markings 16. The display slide is thus illuminated only intermittently and irregularly.

Under daytime driving conditions, both of the bulbs 13 and 14 are lighted whenever generator 38 is driven at a speed great enough to energize them. Under such daytime conditions, tail light switch 42 is of course open, so that relay coil 43 is energized by a circuit extending from the generator through the relay coil, and tail lights 41 to ground. Coil 43 thus retains movable contact 44 of the relay in its closed position to maintain the energizing circuit to bulb 13 closed. As will be understood, coil 43 is designed to draw a very small amount of current, which is insufficient to illuminate tail lights 41.

At night, the driver closes tail light switch 42 to energize lights 41, and in doing so electrically connects the tail light side of the relay coil directly to the positive side of battery 40. The coil 43 is then connected across a circuit extending between the positive side of the generator and the positive side of the battery and is no longer energized to a sufficient extent to close its contact 44. Bright light 13 is thus deenergized so that the sole illumination of the slide during night driving is effected by the relatively dim light 14. If under either daytime or nighttime conditions, the illumination proves too great, switch 23 may be actuated to its full-line Fig. 4 position, to connect resistor 22 into the energizing circuits of the two lights, and thus dim both of the lights.

I claim:

1. In a vehicle having an engine and a generator driven thereby, a mounting in the vehicle for supporting a display element carrying markings at a location within view of a driver of the vehicle, and an electric light positioned to illuminate said display element and connected into a circuit energized only by said generator to be lighted irregularly in accordance with the operation of said generator.

2. In a vehicle having an engine and a generator driven thereby, a light passing display slide having markings to be viewed by a driver of the vehicle, a slide mounting in the vehicle adapted to removably support said slide at a location within sight of the driver, and an electric light positioned behind said slide at a location to illuminate said markings and connected into a circuit energized only by said generator to be lighted irregularly in accordance with the operation of said generator.

3. In a vehicle, electric power supply means, a display element in the vehicle having markings at a location to be viewed by an operator, a pair of electrically energized light elements positioned to illuminate said display element and energized by said power supply means, a night driving electric light visible at the outside of the vehicle by a driver of another vehicle, a switch connected into the energizing circuit to said night driving light, and control means responsive to actuation of said switch to open the energizing circuit to one of said first mentioned light elements.

4. In a vehicle, electric power supply means, a display element in the vehicle having markings at a location to be viewed by an operator, a pair of electrically energized light elements positioned to illuminate said display element and energized by said power supply means, a night driving electric light visible at the outside of the vehicle by a driver of another vehicle, a switch connected into the energizing circuit to said night driving light, and a relay responsive to actuation of said switch to open the energizing circuit to one of said first mentioned light elements.

5. In a vehicle having an engine and a generator driven thereby, a display element having markings to be viewed by a driver of the vehicle, a mounting in the vehicle adapted to removably support said display element at a location within sight of the driver, two electric light elements positioned to illuminate said display element and energized only by said generator, a tail light, a switch connected into the energizing circuit to said tail light and actuable by the driver, and a relay having its coil electrically connected at one end to said generator and at the opposite end to a point between said tail light and switch, said relay having contacts responsive to energization of said coil and connected into the energizing circuit to one of said first mentioned light elements.

6. In a vehicle, electric power supply means, a display element in the vehicle having markings at a location to be viewed by an operator, an electrically energized light element positioned to illuminate said display element and energized by said power supply means, a night driving electric light visible at the outside of the vehicle by a driver of another vehicle, a switch connected into the energizing circuit to said night driving light, and control means responsive to actuation of said switch to open the energizing circuit to said first mentioned light.

7. In a vehicle as recited in claim 6, in which said last mentioned means comprise a relay responsive to actuation of said switch.

8. In a vehicle having an engine and a generator driven thereby, a display element having markings to be viewed by a driver of the vehicle, a mounting in the vehicle adapted to removably support said display element at a location within sight of the driver, an electric light element positioned to illuminate said display element and energized only by said generator, a tail light, a switch connected into the energizing circuit to said tail light and actuable by the driver, and a relay having its coil electrically connected at one end to said generator and at the opposite end to a point between said tail light and switch, said relay having contacts responsive to energization of said coil and connected into the energizing circuit to said first mentioned light element.

References Cited in the file of this patent

UNITED STATES PATENTS

| | | |
|---|---|---|
| 1,236,565 | Hubschmitt | Aug. 14, 1917 |
| 2,165,569 | Obermaier | July 11, 1939 |
| 2,318,596 | Davenport | May 11, 1943 |
| 2,450,450 | Schmidinger | Oct. 5, 1948 |
| 2,598,056 | Hollins | May 27, 1952 |